(12) United States Patent
Sanbayashi et al.

(10) Patent No.: US 7,547,357 B2
(45) Date of Patent: Jun. 16, 2009

(54) TRANSPARENT FILM-FORMING COMPOSITION

(75) Inventors: Masayuki Sanbayashi, Toyama (JP); Jun Tanaka, Tokyo (JP)

(73) Assignee: Showa Denko K.K., Tokyo (JP)

( * ) Notice: Subject to any disclaimer, the term of this patent is extended or adjusted under 35 U.S.C. 154(b) by 357 days.

(21) Appl. No.: 10/577,856

(22) PCT Filed: Oct. 29, 2004

(86) PCT No.: PCT/JP2004/016481

§ 371 (c)(1), (2), (4) Date: Apr. 28, 2006

(87) PCT Pub. No.: WO2005/042152

PCT Pub. Date: May 12, 2005

(65) Prior Publication Data

US 2007/0084381 A1    Apr. 19, 2007

Related U.S. Application Data

(60) Provisional application No. 60/517,101, filed on Nov. 5, 2003.

(30) Foreign Application Priority Data

Oct. 30, 2003    (JP) ............................. 2003-370366

(51) Int. Cl.
*C09K 17/40* (2006.01)
*C23C 16/40* (2006.01)
*B01J 31/14* (2006.01)
*B01J 31/38* (2006.01)

(52) U.S. Cl. ............................ 106/287.17; 106/287.19; 502/103; 502/113

(58) Field of Classification Search ............ 106/287.17, 106/287.19; 502/103, 113
See application file for complete search history.

(56) References Cited

U.S. PATENT DOCUMENTS

| | | | | |
|---|---|---|---|---|
| 3,894,881 A | * | 7/1975 | Suzuki et al. | .......... 106/287.14 |
| 5,248,637 A | * | 9/1993 | Taneda et al. | ................. 501/35 |
| 2003/0181329 A1 | | 9/2003 | Tanaka et al. | |

FOREIGN PATENT DOCUMENTS

| | | |
|---|---|---|
| EP | 0816466 A1 | 1/1998 |
| EP | 1153999 A1 | 11/2001 |
| JP | 62-36045 A | 2/1987 |
| JP | 2-69375 A | 3/1990 |
| JP | 7-216552 A | 8/1995 |
| JP | 9-40872 A | 2/1997 |
| JP | 3027739 B2 | 1/2000 |
| WO | 99/28393 A1 | 6/1999 |
| WO | 2004/014986 A1 | 2/2004 |

* cited by examiner

*Primary Examiner*—Timothy C Vanoy
*Assistant Examiner*—Daniel Berns
(74) *Attorney, Agent, or Firm*—Sughrue Mion, PLLC

(57) ABSTRACT

A composition for forming a transparent film, comprising photocatalytic particles; zirconium ammonium carbonate; a cohydrolysis-polycondensation product of an aluminum alkoxide represented by the formula $Al(OR)_3$ where R is an organic group and a titanium alkoxide represented by the formula $Ti(OR')_4$ where R' is an organic group; and water, and having a pH of 7 to 9.

21 Claims, No Drawings

TRANSPARENT FILM-FORMING COMPOSITION

CROSS REFERENCE TO RELATED APPLICATION

This application is an application filed under 35 U.S.C. §111 (a) claiming benefit, pursuant to 35 U.S.C. §119 (e) (1), of the filing date of the Provisional Application No. 60/517, 101 filed on Nov. 5, 2003, pursuant to 35 U.S.C. §111 (b).

TECHNICAL FIELD

The present invention relates to a composition for forming a transparent film (hereinafter the composition may be referred to as "transparent-film-forming composition") which is capable of forming a transparent and highly durable film and to a method for producing the composition. More particularly, the invention relates to a composition for forming a photocatalytic transparent film that decomposes harmful organic substances through exposure to light, and to a composite member, produced from the composition, which exhibits useful properties, including deodorization, antifouling, hydrophilic, and antibacterial effects.

BACKGROUND ART

Conventionally, in order to enhance the durability of concrete products or iron and steel products, there have been employed coating agents containing a hydrolysis product of an alkoxide of a metal (e.g., silicon, zirconium, or titanium), the agents being capable of forming a highly durable film on the surfaces of the products (e.g., Japanese Patent Application Laid-Open (kokai) Nos. 2-69375 and 62-36045). However, the above coating agents involve problems in that film formation requires heating and the thus-formed film is not transparent.

Meanwhile, there have been proposed photocatalytic semiconductors which generate, through photoexcitation, active oxygen species exhibiting a strong oxidation power. As most organic substances are decomposed by means of the oxidizing effect (i.e., photocatalytic effect) of the active oxygen species, such a photocatalytic semiconductor has been employed as a photocatalyst in various articles for decomposition of malodorous substances, prevention of contamination with organic substances, and antibacterial purposes. The photocatalytic semiconductor exhibits the photocatalytic effect at its surface, and therefore, the semiconductor must be provided on the surface of a member requiring photocatalytic activity. In general, the photocatalytic semiconductor is provided on the surface of such a member by means of a simple process; specifically, a process in which the semiconductor is mixed with a binder, and the resultant mixture is applied onto the member. When an organic polymer serving as a binder is employed in combination with the photocatalytic semiconductor, the binder is oxidized and decomposed because of the photocatalytic effect, raising the need for employment of a binder which is not easily decomposed (e.g., a fluorine resin binder or a silicone resin binder) (Japanese Patent Nos. 2,756, 474 and 3,027,739).

However, when photocatalytic semiconductor particles are incorporated into such a resin binder, the surfaces of the particles are coated with the binder, leading to problems that the binder prevents light or substances to be decomposed from reaching the particles, and lowers the photocatalytic effect of the particles. Also, employment of such a resin binder involves a problem that the resin must be cured through heating.

Japanese Patent Application Laid-Open (kokai) No. 9-40872 discloses a process employing, as a binder, an alkyl silicate condensation product of a relatively low molecular weight obtained through hydrolysis of a hydrolytic silicon compound. In this process, the binder can be cured at a low temperature, and lowering of the photocatalytic effect is suppressed.

However, in this process, hydrolysis must be performed at a pH of 4 or less or under alkaline conditions, and thus a solution containing the binder and photocatalytic particles has acidity or alkalinity. When the solution is applied to a corrosion-prone substrate such as iron or aluminum, the application method must be modified. In addition, the aforementioned condensation product cannot be employed as a binder in a neutral titanium oxide sol.

Japanese Patent Application Laid-Open (kokai) No. 9-40872 discloses a process employing a hydrolytic organometallic compound as a binder. However, this process involves problems in that hydrolysis of the compound is insufficiently regulated, and a titanium oxide sol aggregates and exhibits low storage stability.

Since aluminum alkoxide is very readily hydrolyzed by water in the presence of a small amount of a catalyst, a neutral sol can be formed from aluminum alkoxide. However, difficulty is encountered in forming a transparent and highly durable film from the sol, and the sol has a very short pot life. Meanwhile, Japanese Patent Application Laid-Open (kokai) No. 7-216552 discloses a technique for forming a highly durable film, but this technique involves problems in that a coupling agent which causes impairment of the film must be employed, and curing of the film requires heating.

A photocatalyst requires a binder which has a long pot life, which is not impaired by the photocatalyst, and which enables formation of a transparent and highly stable film.

WO 99/28393 discloses a technique employing a zirconium compound as a binder. Through this technique, a transparent and highly durable film having a skeleton of a zirconium inorganic compound can be formed. However, a heating step is required to cure the formed film.

An object of the present invention is to provide a transparent-film-forming composition which enables, through drying (without heating), formation of a transparent and highly durable film on the surface of a substrate. Another object of the invention is to provide a composite member which decomposes harmful organic substances through exposure to light; i.e., exhibits useful properties, including deodorization, antifouling, hydrophilic, and antibacterial effects.

DISCLOSURE OF THE INVENTION

In order to attain the aforementioned objects, the present invention provides the following.

[1] A composition for forming a transparent film, comprising photocatalytic particles; zirconium ammonium carbonate; a cohydrolysis-polycondensation product of an aluminum alkoxide represented by the formula $Al(OR)_3$ and a titanium alkoxide represented by the formula $Ti(OR')_4$; and water, and having a pH of 7 to 9.

[2] The composition for forming a transparent film as described in [1], wherein the composition is heated at 10 to 400° C. for curing, thereby forming a transparent film.

[3] The composition for forming a transparent film as described in [1] or [2], which comprises the photocatalytic particles in an amount of 0.1 mass % to 5 mass %.

[4] The composition for forming a transparent film as described in any one of [1] to [3], which comprises zirconium ammonium carbonate in an amount of 0.1 mass % to 0.75 mass %.

[5] The composition for forming a transparent film as described in any one of [1] to [4], wherein the photocatalytic particles have an average particle size of 0.001 to 0.1 μm as calculated from the BET specific surface area.

[6] The composition for forming a transparent film as described in any one of [1] to [5], wherein the photocatalytic particles comprise at least one species selected from among titanium dioxide particles and titanium dioxide particles comprising phosphorus-containing compound on their surfaces.

[7] The composition for forming a transparent film as described in [6], wherein the titanium dioxide particles comprise a brookite-crystal phase.

[8] The composition for forming a transparent film as described in any one of [1] to [7], wherein the composition can be applied, without being repelled, to a substrate exhibiting a contact angle with water of 50° or more.

[9] The composition for forming a transparent film as described in any one of [1] to [8], wherein the composition forms a coating film having a hardness of 2 H or more through application onto a substrate and being allowing to stand at 10° C. for 24 hours.

[10] The composition for forming a transparent film as described in any one of [1] to [9], which, after undergoing the steps of applying the composition to a substrate having an area of 400 cm$^2$ to a coating thickness of 200 nm, placing the substrate in a 5-L bag made of fluororesin, feeding into the bag air containing acetaldehyde at a concentration of 20 ppm by mass, sealing the bag; and irradiating the bag with light from a day white fluorescent lamp such that the intensity of a 365 nm UV ray is controlled to 6 μW/cm$^2$, exhibits a percent decomposition of acetaldehyde of 60% or more four hours after the start of irradiation.

[11] The composition for forming a transparent film as described in any one of [1] to [10], wherein, after performance of the following steps: applying the composition to a substrate to a coating thickness of 200 nm and irradiating the coating film from the top thereof with light from a day white fluorescent lamp such that the intensity of a 365 nm UV ray is controlled to 6 μW/cm$^2$, the contact angle between the coating film and water is 10° or less 24 hours after the start of irradiation.

[12] The composition for forming a transparent film as described in any one of [1] to [11], wherein, when the thickness of the film is 200 nm, the film has a total light transmittance of at least 95% and a haze of 1% or less.

[13] The composition for forming a transparent film as described in any one of [1] to [12], wherein the composition comprises the cohydrolysis-polycondensation product of an aluminum alkoxide represented by the formula Al(OR)$_3$ and a titanium alkoxide represented by the formula Ti(OR')$_4$ in an amount of 0.1 mass % to 1 mass % as reduced to Al$_2$O$_3$ or in an amount of 0.01 mass % to 0.1 mass % as reduced to TiO$_2$.

[14] The composition for forming a transparent film as described in any one of [1] to [13], wherein said cohydrolysis-polycondensation product of an aluminum alkoxide represented by the formula Al(OR)$_3$ and a titanium alkoxide represented by the formula Ti(OR')$_4$ has a particle size equivalent to or smaller than that of the photocatalytic particles.

[15] The composition for forming a transparent film as described in any one of [1] to [14], wherein a powder obtained by drying said cohydrolysis-polycondensation product of an aluminum alkoxide represented by the formula Al(OR)$_3$ and a titanium alkoxide represented by the formula Ti(OR')$_4$ has a specific surface area of 100 m$^2$/g or more.

[16] The composition for forming a transparent film as described in any one of [1] to [15], further comprising a surface-active agent.

[17] The composition for forming a transparent film as described in any one of [1] to [16], wherein the film obtained by coating and curing said composition on a substrate and having a thickness of 200 nm exhibits a yellowing degree of 10 or less, after the film is subjected to an acceleration-exposure test employing a xenon arc lamp for 4,000 hours, and exhibits a contact angle with water of 20° or less, after the irradiation of the film for 24 hours with light from a day white fluorescent lamp such that the intensity of a 365 nm UV ray is controlled to 6 μW/cm$^2$.

[18] A method for producing a composition as recited in any one of [1] to [17] for forming a transparent film, the method comprising a step of adding a β-diketone in an amount of 0.1 mol to 3 mol, an acid in an amount of 0.5 to 2 mol, and water in an amount of 1 to 20 mol to 1 mol of aluminum alkoxide represented by the formula Al(OR)$_3$ to form a solution; a step of adding a titanium alkoxide represented by the formula Ti(OR')$_4$ in an amount of 0.01 to 0.5 mol to the solution, while the mixture is heated at 40° C. to 70° C., to form a composition comprising the cohydrolysis-polycondensation product of an aluminum alkoxide represented by the formula Al(OR)$_3$ and a titanium alkoxide represented by the formula Ti(OR')$_4$.

[19] The method as claimed in [18], further comprising a step of adding photocatalytic particles to said composition comprising the cohydrolysis-polycondensation product of an aluminum alkoxide represented by the formula Al(OR)$_3$ and a titanium alkoxide represented by the formula Ti(OR')$_4$.

[20] The method as claimed in [19], wherein the composition for forming a transparent film comprises a hydrophilic solvent in an amount of 10% by mass or less.

[21] A composition for forming a transparent film, which is produced through a method as recited in [17], [18] or [19].

[22] A method for forming a transparent film, comprising coating and curing the composition for forming a transparent film as recited in any one of [1] to [17] and [21] on a substrate.

[23] A material for an exterior wall of a building, a soundproof wall for a road, a windowpane of a building, a glass material for a showcase, a glass material for a fluorescent lamp, a guardrail, a filter for a deodorizing apparatus, a reactor for water treatment, an interior decoration tile, a water bath, or a shade for a lighting apparatus, to which a composition for forming a transparent film as recited in any one of [1] to [17] or in [21] has been applied.

[24] An advertising signboard, a transparent soundproof wall for a road, a transparent resin building material for exterior finishing, or a shade for a lighting apparatus, having a hard coating layer formed by applying a composition for forming a transparent film as recited in any one of claims 1 to 17 or in claim 21.

The transparent-film-forming composition in the present invention enables, without heating, formation of a transparent and highly durable film on the surface of various substrates.

Thus, the aforementioned photocatalytic, transparent-film-forming composition comprising photocatalytic particles, readily forms a transparent film which has high hardness, which is barely impaired by light, and which exhibits, through photoexcitation of the photocatalytic particles, deodorization, antifouling, hydrophilic, and antibacterial effects. Therefore, the composition is applicable to the surface of various substrates.

In accordance with a preferred embodiment of the present invention, the composition can be applied to a hydrophobic substrate without being repelled the surface, and forms a transparent film by only curing at room temperature. Thus, as a remarkably excellent feature, the composition can be applied, without being repelled, to a hard-coat substrate exhibiting a contact angle with water of 50° or more.

BEST MODES FOR CARRYING OUT THE INVENTION

The transparent-film-forming composition according to a preferred embodiment of the present invention is characterized by containing photocatalytic particles; zirconium ammonium carbonate; a cohydrolysis-polycondensation product of an aluminum alkoxide represented by the formula $Al(OR)_3$ and a titanium alkoxide represented by the formula $Ti(OR')_4$; and water, and having a pH of 7 to 9.

The transparent-film-forming composition preferably comprises the photocatalytic particles in an amount of 0.1 mass % to 5 mass %, more preferably 1 mass % to 4 mass %. When the amount is less than 0.1 mass %, the formed film has a small thickness, thereby reducing durability and photocatalytic effect. In addition, the number of application must be increased in order to attain the photocatalytic effect, which is disadvantageous. When the amount is in excess of 5 mass %, aggregation of the transparent-film-forming composition rapidly proceeds, thereby shortening the usable time of the composition.

No particular limitation is imposed on the photocatalytic particles contained in the transparent-film-forming composition, and particles which can be excited by UV light or visible light to form conduction electrons and holes may be employed. Examples of the species comprises tin oxide, zinc oxide, ferric oxide, tungsten trioxide, dibismuth trioxide, strontium titanate, and titanium dioxide.

Of these, chemically stable titanium dioxide is preferred. Titanium dioxide particles having a phosphorus-containing compound, preferably phosphoric acid or a phosphate, particularly a condensed phosphate salt, on their surfaces are preferably employed as photocatalytic particles. The phosphorus-containing compound present on surfaces of the titanium dioxide may have the shape of an island, the shape of a plurality of islands, or the shape of a network.

Preferred examples of the employable phosphorus-containing compound comprise pyrophosphate, metaphosphate, tripolyphosphate, tetrapolyphosphate, metaphosphate, and ultraphosphate. Of these, pyrophosphate is more preferred.

The amount of the phosphorus-containing compound present on the surfaces is preferably 0.01 mass % to 50 mass %, more preferably 0.1 mass % to 20 mass %. When the amount is less than 0.01 mass %, the composition has a pH higher than 7, and transparency of the formed film is impaired. An amount of the phosphoric compound in excess of 50 mass % is not preferred from the viewpoint of economy.

Any crystal form of rutile $TiO_2$, anatase $TiO_2$, and brookite $TiO_2$ may be used. A mixture of these crystal forms may also be used. Among them, titanium dioxide comprising a brookite-crystal phase is preferred from the viewpoint of photocatalytic activity and adhesion strength of the film. More preferably, the amount of titanium dioxide comprising a brookite-crystal phase is 70 mass % or more with respect to the entire titanium dioxide.

The photocatalytic particles preferably have an average primary particle size of 0.001 µm to 0.1 µm, more preferably 0.001 µm to 0.08 µm. This is because, when the particle size exceeds 0.1 µm, the resultant photocatalytic film exhibits poor transparency, whereas, when the particle size is less than 0.001 µm, productivity of the particles is considerably lowered. The average primary particle size is calculated from the BET specific surface area on the assumption that primary particles are true spheres.

Zirconium ammonium carbonate can be incorporated into the composition in order to enhance adhesion strength. The amount of zirconium ammonium carbonate is preferably 0.1 wt. % to 0.75 wt. %, based on the entire transparent-film-forming composition. This is because, when the amount is less than 0.1 wt. %, enhancement of adhesion strength of the film to a substrate is poor, whereas when the amount is in excess of 0.75 wt. %, transparency of the film is impaired.

The aluminum alkoxide-titanium alkoxide cohydrolysis-polycondensation product preferably assumes the form of particles having a size equal to or smaller than that of the photocatalytic particles. For example, it is preferred that a powder obtained through drying of the binder solution at 200° C. has a specific surface area of 100 $m^2/g$ or more. This is because, when the powder has a specific surface area of less than 100 $m^2/g$, adhesion strength may be lowered, and difficulty may be encountered in effecting exposure of the photocatalytic particles, leading to lowering of photocatalytic activity.

No particular limitation is imposed on the organic group "R" in the aluminum alkoxide represented by the formula $Al(OR)_3$, as long as hydrolysis can occur on the aluminum alkoxide, and R may be, independently, linear or branched, and may be a saturated or unsaturated alkyl group or alkyl ester group, or an allyl group. The carbon chain formed from R may arbitrarily comprises a chemical bond such as carbonyl, ether, ester, amido, sulfido, sulfinyl, sulfonyl, or imino. The carbon chain has 1 to 16 carbon atoms, preferably 1 to 8 carbon atoms, more preferably 1 to 4 carbon atoms.

Examples of preferred aluminum alkoxides represented by the formula Al(OR)3 comprises aluminum trimethoxide, aluminum triethoxide, aluminum tripropoxide, and aluminum tributoxide. Of these, aluminum tripropoxide and aluminum trimethoxide are particularly preferred.

No particular limitation is imposed on the organic group "R'" in the titanium alkoxide represented by the formula $Ti(OR')_4$, as far as hydrolysis can occur on the aluminum alkoxide, and R may be, independently, linear or branched, and a saturated or unsaturated alkyl group or an alkyl ester group, or an allyl group. The carbon chain formed from R may arbitrarily comprises a chemical bond such as carbonyl, ether, ester, amido, sulfido, sulfinyl, sulfonyl, or imino. The carbon chain has 1 to 16 carbon atoms, preferably 1 to 8 carbon atoms, more preferably 1 to 4 carbon atoms.

Examples of preferred titanium alkoxides represented by the formula $Ti(OR')_4$ comprises titanium tetraethoxide, titanium tetraisopropoxide, and titanium tetra-n-butoxide. Of these, titanium tetraethoxide and titanium tetraisopropoxide are particularly preferred.

Preferably, the composition comprises the cohydrolysis-polycondensation product of an aluminum alkoxide and a titanium alkoxide in an amount of 0.1 mass % to 1 mass % as reduced to $Al_2O_3$ or in an amount of 0.01 mass % to 0.1 mass % as reduced to $TiO_2$.

When the amount of the cohydrolysis-polycondensation product of an aluminum alkoxide and a titanium alkoxide is less than 0.1 mass % as reduced to $Al_2O_3$ or less than 0.01 mass % as reduced to $TiO_2$, adhesion of the composition to a substrate is insufficient, whereas when the amount is in excess of 1 mass % as reduced to $Al_2O_3$ or 0.1 mass % as reduced to $TiO_2$, the time required for exerting a photocatalytic effect is prolonged.

The amount of the aluminum alkoxide-titanium alkoxide cohydrolysis-polycondensation product can be previously prepared as a solution in which the aluminum alkoxide-titanium alkoxide cohydrolysis-polycondensation product is dispersed. This solution can be described below: The aluminum alkoxide-titanium alkoxide cohydrolysis-polycondensation product dispersed in the solution is 0.5 mass % to 10 mass %, preferably 1 mass % to 5 mass %, more preferably 2 mass % to 4 mass %, as reduced to $Al_2O_3$, and 0.1 mass % to 3 mass %, preferably 0.3 mass % to 2.7 mass %, more preferably 0.5 mass % to 2.5 mass %, as reduced to $TiO_2$. When the amount of the aluminum alkoxide hydrolysis-polycondensation product as reduced to $Al_2O_3$ is less than 0.5 mass %, the amount of the solution must be increased to obtain a predetermined adhesion strength and the other components of the composition are reduced. In contrast, when the amount of the aluminum alkoxide hydrolysis-polycondensation product as reduced to $Al_2O_3$ exceeds 10 mass %, the solution becomes unstable, and precipitates tend to appear. When the amount of the aluminum alkoxide-titanium alkoxide cohydrolysis-polycondensation product as reduced to $TiO_2$ is less than 0.1 mass %, hydrolysis of the aluminum alkoxide does not proceed, whereas when the amount of the product as reduced to $TiO_2$ exceeds 3 mass %, polymerization proceeds excessively, and precipitates tend to appear. Herein, for the sake of convenience, the amount of the hydrolysis-polycondensation product as reduced to $Al_2O_3$ is represented by the Al content of the product as reduced to $Al_2O_3$, and the amount of the cohydrolysis-polycondensation product as reduced to $TiO_2$ is represented by the Ti content of the product as reduced to $TiO_2$. In this case, the amount, by mole, of $Al_2O_3$ is ½ that of Al contained in the aluminum alkoxide hydrolysis-polycondensation product, and the amount, by mole, of $TiO_2$ is equal to that of Ti contained in the titanium alkoxide cohydrolysis-polycondensation product.

When such an aluminum alkoxide or titanium alkoxide is hydrolyzed, the co-presence of an acid is required. The acid may be an inorganic acid or an organic acid. The inorganic acid is preferably hydrochloric acid, nitric acid, or sulfuric acid, more preferably nitric acid. The organic acid is preferably formic acid, acetic acid, propionic acid, or butanoic acid, most preferably acetic acid. The inorganic acid and the organic acid may be employed in combination.

The amount of the acid co-present with the alkoxides is preferably 0.5 mol to 2 mol on the basis of 1 mol of the aluminum alkoxide, more preferably 0.6 to 1.8 mol, most preferably 0.8 to 1.5 mol. When the amount of the acid is less than 0.5 mol, hydrolysis and polycondensation proceed insufficiently, resulting in poor adhesion of the composition, whereas when the amount exceeds 2 mol, the composition may have poor stability, thereby impairing transparency.

In order to suppress hydrolysis of the alkoxide to some extent, and thereby regulating the polymerization degree, addition of a β-diketone is preferred. Since a β-diketone forms a stable complex with a hydrolysis product to thereby prevent formation of precipitates, the β-diketone contributes to enhancement of long-term stability of the aluminum alkoxide-titanium alkoxide cohydrolysis-polycondensation product.

No particular limitation is imposed on the β-diketone, and examples include acetylacetone, 2,4-hexanedione, 2,4-heptanedione, 3,5-heptanedione, and 2,4-octanedione. Of these, acetylacetone is preferred.

The amount of the β-diketone required is 0.1 mol to 3 mol, preferably 0.7 to 2.9 mol, more preferably 1 to 2.9 mol, on the basis of 1 mol of aluminum alkoxide. When the amount of the β-diketone is less than 0.1 mol, stability of the composition is lowered, whereas when the amount exceeds 3 mol, curing of the film requires a long time and a high temperature. Needless to say, both cases are not preferred.

Hydrolysis of the aluminum alkoxide or the titanium alkoxide requires water. The water to be employed may be tap water, ion exchange water, or distilled water. Of these, ion exchange water or distilled water, which does not contain unnecessary ions which may cause storage instability, is preferred.

The amount of water is preferably 1 to 20 mol on the basis of 1 mol of the aluminum alkoxide, more preferably 1 to 15 mol, most preferably 1 to 10 mol. This is because, when the amount of water is less than 1 mol, hydrolysis fails to proceed, whereas when the amount of water exceeds 20 mol, the pot life of the composition is shortened.

An alcohol serving as a solvent is required for regulating the concentration of the aluminum alkoxide or the titanium alkoxide and for controlling the amount of the alkoxide to be hydrolyzed. The alcohol employed as an organic solvent is a hydrophilic alcohol having compatibility with water, which is required for hydrolysis. Examples of preferred alcohols include methanol, ethanol, 1-propanol, 2-propanol, and denatured alcohol containing a mixture thereof. Of these, methanol is more preferred, from the viewpoint of stability.

The amount of the alcohol is preferably 80 to 140 mol on the basis of 1 mol of aluminum alkoxide. When the amount is less than 80 mol, polycondensation proceeds excessively and the resultant dispersion fails to exhibit high adhesion strength, whereas, when the amount of the alcohol exceeds 140 mol, the amount of the hydrolysis-polycondensation product in the solution decreases, and the composition becomes unsuitable for practical use.

The above mentioned components are essential for ensuring adhesion strength and stability of the transparent-film-forming composition.

All the components may be mixed together at once. However, preferably, the solution is prepared through the following procedure: firstly aluminum alkoxide is dissolved in a mixture of the alcohol (i.e., a hydrophilic organic solvent), β-diketone, and acid; subsequently water is added to the resultant mixture; titanium alkoxide is added to the mixture. Alternatively, the titanium alkoxide may be added in the form of a mixture of titanium alkoxide, alcohol, β-diketone, and acid.

After completion of mixing, the resultant mixture is preferably reacted at a temperature of 40° C. to 70° C. under reflux in order to prevent evaporation of low-temperature volatile components. When the reaction temperature is lower than 40° C., the aluminum alkoxide is incompletely dissolved in the mixture, and hydrolysis proceeds insufficiently. In contrast, when the reaction temperature is higher than 70° C., hydrolysis proceeds excessively, and sol-like precipitates are generated. The heating time is preferably 20 minutes to two hours. When the heating time is shorter than 20 minutes, hydrolysis and polycondensation of the aluminum alkoxide proceed insufficiently, whereas when the heating time is longer than two hours, hydrolysis and polycondensation proceed excessively leading to a low adhesion strength of the composition.

A transparent film-forming composition is prepared from the above described cohydrolysis-polycondensation product dispersion, zirconium ammonium carbonate, and photocatalytic particles, in which the amount of the hydrophilic organic solvent in the transparent-film-forming composition may be reduced to 10 mass % or less. In this case, the composition will suit the working environment as well as fully exhibiting its functions such as a photocatalytic effect and adhesion.

The above-prepared composition for forming a photocatalytic, transparent film has a pH of 7 to 9 (i.e., neutral), and thus can be applied to a wide range of substrates and applicator materials. In addition, the composition enables improvement of the working environment.

From the viewpoint of applicability, the transparent-film-forming composition may further contain an appropriate amount of a surfactant. Examples of the surfactant which may be employed include condensed phosphate salts, lignin sulfonate salts, carboxymethyl cellulose, naphthalenesulfonate salt-formalin condensation products, poly(acrylic acid) salts, acrylic acid-maleate salt copolymers, olefin-maleate salt copolymers, alkyl diphenyl ether disulfonate salts, and non-ionic surfactants. Preferably, polyacrylic acid-based surfactants and polyoxyethylene alkyl ethers are employed.

The composite member of the present invention may be produced by applying the aforementioned photocatalytic transparent-film-forming composition to a surface of the member.

When the transparent-film-forming composition of the present invention is applied to a substrate such that a film formed through drying (for example at 10 to 40° C.) of the composition has a thickness of 200 nm, the total light transmittance of the film may be increased to 95% or more. When the total light transmittance is lower than 95%, the film exhibits poor transparency, and the characteristics (e.g., color and decorative aspect) of the substrate are impaired.

Application of the composition may be performed by means of a typical technique such as spin coating, spray coating, flow coating, dip coating, or bar coating. The thickness of the film is preferably 0.01 μm to 3 μm, from the viewpoints of transparency and film strength. From the viewpoint of suppression of the interference color of the film, the thickness of the film is 0.01 μm to 0.3 μm, preferably 0.8 μm to 3 μm.

After being applied onto a substrate, the transparent-film-forming composition is cured at 10° C. to 40° C. for at least 24 hours, to thereby form a transparent film. The thus-formed film has a hardness of 2 H or more as measured by means of a pencil hardness test, and has adhesive strength suitable for practical use. The pencil hardness test is specified in JIS K-5400.

When a stronger film is required, the transparent-film-forming composition is applied onto a substrate, and then cured at 40° C. to 400° C. for five minutes to 24 hours. The higher the curing temperature, the shorter the curing time. The thus-formed film has a hardness of 4H or more as measured by means of the pencil hardness test.

Through formation of the film on a substrate, a composite member is produced. The member exhibits, after irradiating the film, from the top thereof, with light from a day white fluorescent lamp such that the intensity of a 365 nm UV ray is controlled to 6 μW/cm² (when the intensity of a 365 nm UV ray of a day white fluorescent lamp is controlled to 6 μW/cm², the effect of the UV rays can be ignored for any day white fluorescent lamp and the effect of day white light from the day white fluorescent lamp can be observed), a contact angle between the surface and water is 10° or less 24 hours after the irradiation.

The film of the present invention exhibits excellent durability in the use environment. Specifically, even when the film is subjected to an acceleration-exposure test employing a xenon lamp for 4,000 hours, the film is not deteriorated; i.e., the film is suitable for practical use. The composite member exhibits a yellowing degree of 10 or less, after the member is subjected to an acceleration-exposure test for 4,000 hours, and exhibits a contact angle with water of 20° or less, after the start of irradiation of the film for 24 hours with light from a day white fluorescent lamp such that the intensity of a 365 nm UV ray is controlled to 6 μW/cm². The acceleration-exposure test is specified by JIS K-5600.

When the thus-formed photocatalytic transparent film incorporated into a composite member is photoexcited such that the contact angle between the film and water becomes 10° or less, and then the film is allowed to stand in the dark for 48 hours, the contact angle between the film and water is 10° or less.

No particular limitation is imposed on the substrate, and examples include substrates formed of glass, metal, concrete, ceramics, stone, plaster board, and ceramic board. When the composition is applied to a plastic substrate or a similar substrate, in order to prevent impairment of the substrate by the photocatalytic effect, an inorganic hard coating is provided on the substrate. Examples of the inorganic hard coating include silica-based hard coats and titania-based hard coats. The composition of the present invention can be applied, without being repelled, to a hard-coat substrate (e.g., a substrate coated with a silicone hard coating) exhibiting a contact angle with water of 50° or more.

The composite member having such a coating is applicable to, for example, a material for an exterior wall of a building, a soundproof wall for a road, a guardrail, a bridge structure, a windowpane of a building, a glass material for a building, a glass material for a showcase, a glass material for a fluorescent lamp, an advertising signboard, a transparent soundproof wall for a road, a transparent resin building material for exterior finishing, a filter for a deodorizing apparatus, a reactor for water treatment, an interior decoration tile, a water bath, a wall of a flowing-water channel, and a shade for a lighting apparatus.

EXAMPLES

The present invention will next be described in more detail by way of Examples, which should not be construed as limiting the invention thereto.

Example 1

(Titanium Dioxide)

Ion exchange water (50 L), which had been weighed in advance, was heated to 98° C. with stirring and maintained at this temperature. A titanium tetrachloride aqueous solution (Ti concentration: 15%) (product of Sumitomo Titanium Corporation) (3.6 kg) was added dropwise to the heated water over 60 minutes. The thus-obtained white suspension was subjected to dialysis by use of an electric dialyzer, to thereby adjust the pH of the suspension to 4. A portion of a solid contained in the liquid was subjected to structure analysis by use of an X-ray diffraction apparatus, and the obtained powder was found to be a brookite-crystal-form titanium dioxide. Subsequently, sodium pyrophosphate (0.1 kg) was added to the titanium dioxide sol, and the mixture was sufficiently stirred so as to form a dispersion. The dispersion was filtered and washed by means of a rotary filter press, to thereby form a phosphate-treated titanium dioxide sol. The slurry was found to have a solid content of 10 mass % and a pH of 8. The titanium dioxide particles in the sol were found to have an average primary particle size of 0.04 μm as calculated from the BET specific surface area on the assumption that primary particles are true spheres.

(Aluminum Alkoxide-titanium Alkoxide Cohydrolysis-Polycondensation Product Dispersion)

Ion exchange water (30 g), methanol (1.5 L), acetylacetone (50 g), and 60% nitric acid (10 g) were fed into a reaction container equipped with a reflux condenser, and heated to 40° C. with stirring and maintained at this temperature. Aluminum triisopropoxide (80 g) was added to the mixture, followed by refluxing for one hour. Thereafter, titanium triisopropoxide (20 g), acetic acid (20 g), acetylacetone (20 g) were added to the reflux product, and the mixture was further refluxed for one hour, to thereby prepare a dispersion.

(Transparent-film-forming Composition)

The aforementioned titanium dioxide sol (300 g) and ion exchange water (577.5 g) were mixed, and zirconium ammonium carbonate (20 mass % (as reduced to $ZrO_2$) solution, AZC, product of Nippon Light Metal Co., Ltd.) (22.5 g) and the aluminum alkoxide-titanium alkoxide cohydrolysis-polycondensation product dispersion (100 g) were added to the mixture, to thereby form a transparent-film-forming composition. The composition has a pH of 8.5.

(Transparent Film)

The composition was applied to a glass slide (Micro Slide Glass S7213, product of Matsunami Glass Ind., Ltd.) by means of spin coating, and dried and cured at 20° C. for 24 hours. The thickness of the formed film was measured by use of a contact-type surface roughness meter (Surfcorder SE-30D, product of Kosaka Laboratory Ltd.), and was found to be 0.2 μm. An untreated glass slide and the glass slide having a transparent film formed from the composition were subjected to measurement of total light transmittance by use of a haze meter (TC-HIIIDPK, product of Tokyo Denshoku Co., Ltd.), and the total light transmittance of the film-formed glass slide was calculated on the basis of the total light transmittance of the untreated glass slide (taken as 100%). As a result, the total light transmittance of the film was found to be 96%, and the haze thereof was found to be 0.1%. The transparent film was subjected to the pencil hardness test, and the film was found to have a hardness of 3H. The film-coated glass slide was subjected to the acceleration-exposure test employing a xenon lamp for 4,000 hours, and then the film was subjected to the pencil hardness test. As a result, the film was found to have a hardness of 3H. The hydrophilicity of the film was evaluated on the basis of the contact angle between the surface layer of the film and a water droplet on the surface layer. For evaluation, the coating film was irradiated from the top thereof with light from a day white fluorescent lamp such that the intensity of a 365 nm UV ray was controlled to 6 μW/cm², and the contact angle between the coating film and a droplet of water was measured 24 hours after the start of irradiation. The contact angle was measured by use of a contact angle meter (CA-D, product of Kyowa Interface Science Co., Ltd.). As a result, the contact angle was found to be 6°. The degree of yellowing of the film was determined to be 2 by means of a spectral calorimeter (CM-3700d, product of Minolta), after the film-coated glass slide had been subjected to the acceleration-exposure test employing a xenon lamp for 4,000 hours. After the coating film had been irradiated with light from a day white fluorescent lamp for 24 hours such that the intensity of a 365 nm UV ray was controlled to 6 μW/cm², the contact angle between the coating film and water was found to be 16°.

(Photocatalytic Activity)

Photocatalytic activity of the film was investigated under the following conditions.

A photocatalytic coating film was formed on a glass plate (20 cm×20 cm) to a coating thickness of 0.2 μm. The coated glass plate was placed in a Tedler (registered trademark) bag (5 L). Dry air (about 5 L) containing acetaldehyde (20 ppm by volume) was fed into the bag, and the bag was sealed. The coated glass plate was irradiated with light from a day white fluorescent lamp (Day white fluorescent lamp, type FL20SSN/18, 20 W, product of Toshiba Lighting & Technology Corporation) such that the intensity of 365 nm UV light was controlled to 6 μW/cm².

Four hours after the start of irradiation, the acetaldehyde concentration in a gas contained in the bag was determined by use of a gas sensing tube (No. 92L, product of Gastec Corporation). The acetaldehyde concentration was found to be 4 ppm. The acetaldehyde concentration of the gas contained in another sample bag which had been allowed to stand in the dark for four hours was determined to be 18 ppm. Percent decomposition of acetaldehyde was determined to be 88% on the basis of the following equation:

Percent decomposition (%)=100×(initial concentration−concentration after irradiation)/(concentration after storage in the dark).

Example 2

The same titanium dioxide sol as employed in Example 1 (180 g) and ion exchange water (702 g) were mixed, and zirconium ammonium carbonate (20 mass % (as reduced to $ZrO_2$) solution, Bacote 20 (registered trademark), product of Nippon Light Metal Co., Ltd.) (18 g) and the aluminum alkoxide-titanium alkoxide cohydrolysis-polycondensation product dispersion (100 g) were added to the mixture, to thereby form a transparent-film-forming composition. The composition has a pH of 8.9. In a similar manner, the composition was applied to a glass slide through a flow-coating method, and the applied composition was dried and cured at 20° C. for 24 hours. The film was found to have a thickness of 0.2 μm, a total light transmittance of 97%, a haze of 0.1%, and a pencil hardness of 3H. The hydrophilicity, as determined through the same procedure as employed in Example 1, was found to be 4°. The degree of yellowing of the film, after the acceleration-exposure test employing a xenon lamp for 4,000 hours, was determined to be 2. After the coating film had been irradiated with light from a day white fluorescent lamp for 24 hours such that the intensity of a 365 nm UV ray was controlled to 6 μW/cm², the contact angle between the coating film and water was found to be 12°. The photocatalytic activity, as determined through the same procedure as employed in the above Example, was found to be 77%.

Example 3

The same titanium dioxide sol as employed in Example 1 (180 g) and ion exchange water (706.5 g) were mixed, and zirconium ammonium carbonate (20 mass % (as reduced to $ZrO_2$) solution, Bacote 20 (registered trademark), product of Nippon Light Metal Co., Ltd.) (13.5 g) and the aluminum alkoxide-titanium alkoxide cohydrolysis-polycondensation product dispersion (100 g) were added to the mixture, to thereby form a transparent-film-forming composition. The composition had a pH of 8.1. The composition was applied through a flow-coating method to an acrylic polymer plate coated with an organic/inorganic composite hard coating agent (contact angle with water: 80 to 90°), and the applied composition was dried and cured at 20° C. for 24 hours. The film was found to have a thickness of 0.2 µm, a total light transmittance of 97%, a haze of 0.1%, and a pencil hardness of 3H. The hydrophilicity, as determined through the same procedure as employed in Example 1, was found to be 5°. The degree of yellowing of the film, after the acceleration-exposure test employing a xenon lamp for 4,000 hours, was determined to be 7. After the coating film had been irradiated with light from a day white fluorescent lamp for 24 hours such that the intensity of a 365 nm UV ray was controlled to 6 µW/cm$^2$, the contact angle between the coating film and water was found to be 12°. The photocatalytic activity, as determined through the same procedure, was found to be 83%.

Example 4

Anatase-type titanium oxide (Super Titania (registered trade mark) F6, product of Showa Titanium K.K.) was dispersed in water and pH was adjusted to 8. The thus formed 10%-aqueous solution (180 g) and ion exchange water (698 g) were mixed, to which zirconium ammonium carbonate (20 mass % solution as reduced to $ZrO_2$, zirconium ammonium carbonate Bacote 20 (registered trade mark), product of Nippon Light Metal Co., Ltd.) (27 g) and an aluminum alkoxide-titanium alkoxide cohydrolysis-polycondensation product dispersion (100 g) were added to thereby form a film-forming composition. When the aluminum alkoxide-titanium alkoxide cohydrolysis-polycondensation product dispersion was dried by heating to obtain a powder, which was revealed to have a specific surface area of 181 m$^2$/g. The film-forming composition had a pH of 8.9. The composition was applied through a flow-coating method on a slide glass plate, and the applied composition was dried and cured at 20° C. for 24 hours. The film was found to have a thickness of 0.2 µm, a total light transmittance of 95%, a haze of 0.3% and a pencil hardness of 3H. The hydrophilicity, as determined through the same procedure as employed in Example 1, was found to be 7°. The degree of yellowing of the film, after acceleration-exposure test employing a xenon lamp for 4,000 hours, was determined to be 2. After the coating film had been irradiated with light from a day white fluorescent lamp for 24 hours such that the intensity of a 365 nm UV ray was controlled to 6 µW/cm$^2$, the contact angle between the coating film and water was found to be 15°. The photocatalytic activity, as determined through the same procedure as employed in Example 1, was found to be 65%.

Example 5

An aluminum alkoxide-titanium alkoxide cohydrolysis-polycondensation product dispersion was prepared as below.

Methanol (1.5 L), acetylacetone (50 g), ion exchange water (30 g), and a 60%-nitric acid solution (10 g) were fed into a reaction container equipped with a reflux condenser, and heated to 40° C. with stirring and maintained at this temperature. Aluminum triisopropoxide (50 g) was added to the mixture, followed by refluxing for one hour. Thereafter, titanium tetraisopropoxide (40 g), acetic acid (20 g) and acetylacetone (20 g) were added to the reflux product, and the mixture was further refluxed for one hour, to thereby prepare a dispersion. The dispersion was dried by heating, to obtain a powder having a specific surface area of 153 m$^2$/g.

The same titanium dioxide sol as used in Example 1 (180 g) and ion exchange water (706.5 g) were mixed. Zirconium ammonium carbonate (20 mass % solution as reduced to $ZrO_2$, zirconium ammonium carbonate Bacote 20 (registered trade mark), product of Nippon Light Metal Co., Ltd.) (13.5 g) and the above aluminum alkoxide-titanium alkoxide cohydrolysis-polycondensation product dispersion (100 g) were added to the mixture to thereby form a film-forming composition. The composition had a pH of 8.5. The composition was applied through a flow-coating method on an acrylic polymer plate coated with an organic/inorganic composite hard coating agent, and the applied composition was dried and cured at 20° C. for 24 hours. The film was found to have a thickness of 0.2 µm, a total light transmittance of 96%, a haze of 0.1% and a pencil hardness of 3H. The hydrophilicity, as determined through the same procedure as employed in Example 1, was found to be 5°. The degree of yellowing of the film, after acceleration-exposure test employing a xenon for 4,000 hours, was determined to be 7. After the coating film had been irradiated with light from a day white fluorescent lamp for 24 hours such that the intensity of 365 nm UV light was controlled to 6 µW/cm$^2$, the contact angle between the coating film and water was found to be 12°. The photocatalytic activity, as determined through the same procedure as employed in Example 1, was found to be 89%.

Example 6

A titanium dioxide sol was obtained by the same procedures as employed in Example 1 except that 0.1 kg of sodium pyrophosphate (food additive, produced by Taiheiyo Chemical Industries, Ltd) used in Example 1 was substituted by 0.1 kg of sodium tripolyphosphate (food additive, produced by Taiheiyo Chemical Industries, Ltd). The thus obtained titanium dioxide sol (180 g) and ion exchange water (706.5 g) were mixed, and zirconium ammonium carbonate (20 mass % (as reduced to $ZrO_2$) solution, Bacote 20 (registered trademark), product of Nippon Light Metal Co., Ltd.) (18 g) and the aluminum alkoxide-titanium alkoxide cohydrolysis-polycondensation product dispersion (100 g) were added to the mixture, to thereby form a transparent-film-forming composition. The composition has a pH of 8.8. The composition was applied through a flow-coating method onto an acrylic plate with a coating of an organic/inorganic composite hard coating agent, and the applied composition was dried and cured at 20° C. for 24 hours. The film was found to have a thickness of 0.2 µm, a total light transmittance of 97%, a haze of 0.3%, and a pencil hardness of 3H. The hydrophilicity, as determined through the same procedure as employed in Example 1, was found to be 6°. The degree of yellowing of the film, after the acceleration-exposure test employing a xenon lamp for 4,000 hours, was determined to be 2. After the coating film had been irradiated with light from a day white fluorescent lamp for 24 hours such that the intensity of a 365 nm UV ray was controlled to 6 µW/cm$^2$, the contact angle between the coating film and water was found to be 13°. The photocatalytic activity, as determined through the same procedure as employed in the above Example, was found to be 73%.

Comparative Example 1

The same titanium dioxide sol as employed in Example 1 (180 g) and ion exchange water (706.5 g) were mixed, and the aluminum alkoxide-titanium alkoxide cohydrolysis-polycondensation product dispersion (100 g) was added to the mixture, to thereby form a transparent-film-forming composition. The composition had a pH of 7.2. The composition was applied through a flow-coating method to an acrylic polymer plate coated with an organic/inorganic composite hard coating agent, and the applied composition was dried and cured at 20° C. for 24 hours. The pencil hardness of the film was found to be as low as B. The film was found to have a total light transmittance of 93% and a haze of 0.9%. The hydrophilicity, as determined through the same procedure as employed in Example 1, was found to be 8°. The degree of yellowing of the film, after the acceleration-exposure test employing a xenon lamp for 4,000 hours, was determined to be 7. After the coating film had been irradiated with light from a day white fluorescent lamp for 24 hours such that the intensity of 365 nm UV light was controlled to 6 µW/cm², the contact angle between the coating film and water was found to be 14°. The photocatalytic activity, as determined through the same procedure, was found to be 45%.

Comparative Example 2

The same titanium dioxide sol as employed in Example 1 (180 g) and ion exchange water (706.5 g) were mixed, and zirconium ammonium carbonate (20 mass % (as reduced to $ZrO_2$) solution, Bacote 20 (registered trademark), product of Nippon Light Metal Co., Ltd.) (13.5 g) was added to the mixture, to thereby form a composition. The composition has a pH of 9.1. The composition was applied through a flow-coating method to an acrylic polymer plate coated with an organic/inorganic composite hard coating agent (contact angle with water: 80 to 90°), and the applied composition was dried and cured at 20° C. for 24 hours. However, a uniform film failed to form, and granular deposits were formed due to the repellency of the hard coating layer.

Comparative Example 3

Ion exchange water (50 L), which had been weighed in advance, was heated to 98° C. with stirring and maintained at this temperature. A titanium tetrachloride aqueous solution (Ti concentration: 15%) (product of Sumitomo Titanium Corporation) (3.6 kg) was added dropwise to the heated water over 60 minutes. The thus-obtained white suspension was subjected to dialysis by use of an electric dialyzer, to thereby adjust the pH of the suspension to 4. A portion of a solid contained in the suspension (solid content: 10%) was subjected to structure analysis by use of an X-ray diffraction apparatus, and the obtained powder was found to be of brookite-crystal-form titanium dioxide. The suspension (180 g) and ion exchange water (706.5 g) were mixed, and zirconium ammonium carbonate (20 mass % (as reduced to $ZrO_2$) solution, Bacote 20 (registered trademark), product of Nippon Light Metal Co., Ltd.) (13.5 g) and the aluminum alkoxide-titanium alkoxide cohydrolysis-polycondensation product dispersion (100 g) were added to the mixture, to thereby form a transparent-film-forming composition. However, the composition because opaque due to aggregation, and failed to provide a transparent film.

Comparative Example 4

The same titanium dioxide sol as employed in Example 1 (180 g) and ion exchange water (706.5 g) were mixed, to which a 20%-aqueous solution of zirconil nitrate hydrate (reagent produced by Kanto Chemical Inc.) (20 g) was mixed, to thereby prepare a composition. However, the composition was clouded by coagulation so that it could not form a transparent film.

Comparative Example 5

The same titanium dioxide sol as employed in Example 1 (180 g) and ion exchange water (706.5 g) were mixed, to which an ethanol solution of zirconium tetrabutoxide hydrolyzed with an aqueous nitric acid solution (20 mass % as reduced to $ZrO_2$) (13.5 g) was mixed, to thereby prepare a composition. However, the composition was clouded by coagulation so that it could not form a transparent film.

Comparative Example 6

The same titanium dioxide sol as used in Example 1 (180 g) and ion exchange water (706.5 g) were mixed. An aqueous acrylic silicon emulsion resin solution (solid content of 20%) (67 g) was added to the mixture to thereby form a film-forming composition. The composition was applied through a flow-coating method on an acrylic polymer plate coated with an organic/inorganic composite hard coating agent, and the applied composition was dried and cured at 20° C. for 24 hours. However, the film formed from the composition had a low pencil hardness of B. The film had a total light transmittance of 95% and a haze of 0.4%. The hydrophilicity, as determined through the same procedure as employed in Example 1, was found to be 25°. The degree of yellowing of the film, after acceleration-exposure test employing a xenon lamp for 4,000 hours, was determined to be 7. After the coating film had been irradiated with light from a day white fluorescent lamp for 24 hours such that the intensity of 365 nm UV light was controlled to 6 µW/cm², the contact angle between the coating film and water was found to be 22°. The photocatalytic activity, as determined through the same procedure as employed in Example 1, was found to be 38%.

INDUSTRIAL APPLICABILITY

According to the present invention, a transparent-film-forming composition which enables, through drying but without heating, formation of a transparent and highly durable film on the surface of a substrate is provided. Also a composite member which decomposes harmful organic substances through exposure to light; i.e., exhibits useful properties, including deodorization, antifouling, hydrophilic, and antibacterial effects is provided. Therefore the present invention is applicable to and useful in industry.

The invention claimed is:
1. A composition for forming a transparent film, comprising photocatalytic particles; zirconium ammonium carbonate in an amount of 0.1 mass % to 0.75 mass %; a cohydrolysis-polycondensation product of an aluminum alkoxide represented by the formula $Al(OR)_3$ where R is an organic group and a titanium alkoxide represented by the formula $Ti(OR')_4$ where R' is an organic group in an amount of 0.1 mass % to 1 mass % as reduced to $Al_2O_3$ and in an amount of 0.01 mass % to 0.1 mass % as reduced to $TiO_2$; and water, and having a pH of 7 to 9, wherein said composition being able to be cured at 10 to 20° C. to form a transparent film.

2. The composition for forming a transparent film according to claim 1, which comprises the photocatalytic particles in an amount of 0.1 mass % to 5 mass %.

3. The composition for forming a transparent film according to claim 1, wherein the photocatalytic particles have an average particle size of 0.001 to 0.1 µm as calculated from the BET specific surface area.

4. The composition for forming a transparent film according to claim 1, wherein the photocatalytic particles comprise at least one species selected from the group consisting of titanium dioxide particles and titanium dioxide particles comprising phosphorus-containing compound on their surfaces.

5. The composition for forming a transparent film according to claim 4, wherein the titanium dioxide particles comprise a brookite-crystal phase.

6. The composition for forming a transparent film according to claim 1, wherein the composition can be applied, without being repelled, to a substrate exhibiting a contact angle with water of 50° or more.

7. The composition for forming a transparent film according to claim 1, wherein the composition forms a coating film, having a hardness of 2 H or more, after application onto a substrate and being allowed to stand at 10° C. for 24 hours.

8. The composition for forming a transparent film according to claim 1, which, after undergoing the steps of applying the composition to a substrate having an area of 400 cm$^2$ to a coating thickness of 200 nm, placing the substrate in a 5-L bag made of fluororesin, feeding into the bag air containing acetaldehyde at a concentration of 20 ppm by mass, sealing the bag; and irradiating the bag with light from a day white fluorescent lamp such that the intensity of 365 nm UV light is controlled to 6 μW/cm$^2$, exhibits a percent decomposition of acetaldehyde of 60% or more four hours after the start of irradiation.

9. The composition for forming a transparent film according to claim 1, wherein, after the following steps: applying the composition to a substrate to a coating thickness of 200 nm and irradiating the coating film from the top thereof with light from a day white fluorescent lamp such that the intensity of 365 nm UV light is controlled to 6 μW/cm$^2$, the contact angle between the coating film and water is 10° or less, 24 hours after the start of irradiation.

10. A composition for forming a transparent film according to claim 1, wherein, when the thickness of the film is 200 nm, the film has a total light transmittance of at least 95% and a haze of 1% or less.

11. The composition for forming a transparent film according to claim 1, wherein said cohydrolysis-polycondensation product of an aluminum alkoxide represented by the formula Al(OR)$_3$ and a titanium alkoxide represented by the formula Ti(OR')$_4$ has a particle size equivalent to or smaller than that of the photocatalytic particles.

12. The composition for forming a transparent film according to claim 1, wherein a powder obtained by drying said cohydrolysis-polycondensation product of an aluminum alkoxide represented by the formula Al(OR)$_3$ and a titanium alkoxide represented by the formula Ti(OR')$_4$ has a specific surface area of 100 m$^2$/g or more.

13. The composition for forming a transparent film according to claim 1, further comprising a surface active agent.

14. The composition for forming a transparent film according to claim 1, wherein the film obtained by coating and curing said composition on a substrate and having a thickness of 200 nm exhibits a yellowing degree of 10 or less, after the film is subjected to an acceleration-exposure test employing a xenon arc lamp for 4,000 hours, and exhibits a contact angle with water of 20° or less, after the irradiation of the film for 24 hours with light from a day white fluorescent lamp such that the intensity of 365 nm UV light is controlled to 6 μW/cm$^2$.

15. A method for producing a composition as recited in claim 1 for forming a transparent film, the method comprising a step of adding a β-diketone in an amount of 0.1 mol to 3 mol, an acid in an amount of 0.5 to 2 mol, and water in an amount of 1 to 20 mol to 1 mol of aluminum alkoxide represented by the formula Al(OR)$_3$ to form a solution; a step of adding a titanium alkoxide represented by the formula Ti(OR')$_4$ in an amount of 0.01 to 0.5 mol to the solution, while the mixture is heated at 40° C. to 70° C. to form a composition comprising the cohydrolysis-polycondensation product of an aluminum alkoxide represented by the formula Al(OR)$_3$ and a titanium alkoxide represented by the formula Ti(OR')$_4$.

16. The method as claimed in claim 15, further comprising a step of adding photocatalytic particles to said composition comprising the cohydrolysis-polycondensation product of an aluminum alkoxide represented by the formula Al(OR)$_3$ and a titanium alkoxide represented by the formula Ti(OR')$_4$.

17. The method as claimed in claim 16, wherein the composition for forming a transparent film comprises a hydrophilic solvent in an amount of 10% by mass or less.

18. A composition for forming a transparent film, which is produced through a method as recited in claim 15.

19. A method for forming a transparent film, comprising coating and curing the composition for forming a transparent film as recited in claim 1.

20. A material for an exterior wall of a building, a soundproof wall for a road, a windowpane of a building, a glass material for a showcase, a glass material for a fluorescent lamp, a guardrail, a filter for a deodorizing apparatus, a reactor for water treatment, an interior decoration tile, a water bath, or a shade for a lighting apparatus, to which a composition for forming a transparent film as recited in claim 1 has been applied.

21. An advertising signboard, a transparent soundproof wall for a road, a transparent resin building material for exterior finishing, or a shade for a lighting apparatus, having a hard coating layer formed by applying a composition for forming a transparent film as recited in claim 1.

* * * * *